United States Patent
Larson et al.

(10) Patent No.: US 8,103,076 B2
(45) Date of Patent: Jan. 24, 2012

(54) METHOD FOR TRANSCATHETER INTRA-ARTERIAL PERFUSION MAGNETIC RESONANCE IMAGING

(75) Inventors: Andrew Christian Larson, Kildeer, IL (US); Reed Ali Omary, Chicago, IL (US); Dingxin Wang, Evanston, IL (US)

(73) Assignee: Northwestern University, Evanston, IL (US)

( * ) Notice: Subject to any disclaimer, the term of this patent is extended or adjusted under 35 U.S.C. 154(b) by 714 days.

(21) Appl. No.: 12/262,651

(22) Filed: Oct. 31, 2008

(65) Prior Publication Data
US 2009/0116711 A1 May 7, 2009

Related U.S. Application Data

(60) Provisional application No. 60/984,081, filed on Oct. 31, 2007.

(51) Int. Cl.
*G06K 9/20* (2006.01)
(52) U.S. Cl. ........ 382/130; 382/132; 128/922; 250/302; 600/363
(58) Field of Classification Search .................. 382/128, 382/130, 131, 132; 600/363
See application file for complete search history.

(56) References Cited

U.S. PATENT DOCUMENTS
2005/0265923 A1* 12/2005 Toner et al. ................... 424/1.11
2008/0281205 A1* 11/2008 Naghavi et al. ............... 600/458

FOREIGN PATENT DOCUMENTS
WO    WO 2005070299 A1 *  8/2005

* cited by examiner

*Primary Examiner* — Benjamin Sandvik
*Assistant Examiner* — Wensing Kuo
(74) *Attorney, Agent, or Firm* — Schiff Hardin LLP (57) ABSTRACT

A method to serially determine changes in perfusion to tissues is provided. This method involves injecting contrast material into a catheter that is positioned in the blood supply proximal to the targeted tissue of interest, acquiring a time series of images that depicts the uptake of this contrast material within the tissue, deriving semi-quantitative or quantitative perfusion metrics based upon the time series of perfusion images, altering perfusion to the targeted tissue by means of injecting pharmacologic agents or embolic agents into the blood vessels supplying the targeted tissue, repeating the acquisition of perfusion images to serially monitor changes in tissue perfusion after each alteration, and calculating changes in perfusion metrics after each series of perfusion images. This method is used to monitor changes in perfusion to various tissues, including a diverse array of tumors. The perfusion imaging method can be acquired using magnetic resonance, x-ray computed tomography, or radionuclide imaging. The perfusion metric is serially measured during an embolization procedure as a means of measuring changes in tissue perfusion or to target an endpoint based upon a specific alteration in the calculated perfusion metric.

19 Claims, 8 Drawing Sheets

METHOD FOR TRANSCATHETER INTRA-ARTERIAL PERFUSION MAGNETIC RESONANCE IMAGING

CROSS-REFERENCE TO RELATED APPLICATION

This application claims the benefit of U.S. Provisional Patent Application Ser. No. 60/984,081, filed Oct. 31, 2007, which is incorporated herein by reference.

BACKGROUND OF THE INVENTION

1. Field of the Invention

The present invention relates generally to a method for imaging of biological tissues and in particular to a method for imaging tumors using a magnetic resonance imaging device to monitor an embolization procedure.

2. Description of the Related Art

Tumors may be surgically removed, or resected, if possible. However, some tumors are unresectable and so other procedures must be used. One such procedure is embolization, or the selective occlusion of blood vessels to slow or stop the blood flow to the tumor so as to reduce tumor size. One area for use of embolization is for the treatment of liver lesions, an example of which is hepatocellular carcinoma, one of the more common liver tumors. The procedure for embolization that uses a catheter to deliver the embolic agent to an artery is termed transcatheter arterial embolization. Transcatheter arterial chemoembolization (TACE) is an interventional procedure in which chemotherapeutic medications and embolic particles are injected via a catheter into a blood vessel supplying the tumor.

The transcatheter arterial embolization (TAE) and transcatheter arterial chemoembolization (TACE) procedures preferentially deliver embolic agents to a hepatocellular carcinoma (HCC) via catheters positioned within the hepatic arteries. Currently, data supporting optimum embolic endpoints for the TAE and TACE procedures (sub-stasis endpoints or alternatively complete stasis of antegrade blood flow) remains conspicuously lacking. Complete stasis of flow may increase normal liver toxicity and potentially induces release of growth factors promoting tumor growth. Embolization to levels beyond therapeutic benefit may accelerate liver decompensation and subsequent failure. Determination of end points for the embolization process is needed. However, accurate intra-procedural tumor perfusion measurements are currently not possible with conventional digital subtraction angiography (DSA) imaging techniques, thus representing a significant limitation for evaluating the efficacy of sub-stasis endpoints.

The selection of optimal embolic endpoints during TAE and TACE remains controversial. Rational arguments can be made in support of either of stasis or sub-stasis endpoints but there currently exist no quantitative data to support such hypotheses. One reason for the lack of such data has been the inability to reproducibly assess sub-stasis endpoints of tumor perfusion using conventional DSA. Monitoring of TAE with DSA relies upon highly subjective assessment of reductions to antegrade blood flow. Although the spatial resolution of DSA permits superior visualization of vascular anatomy, small or hypo-vascular tumors can be poorly visualized. While the recently introduced 3D x-ray angiography system has improved turn or visualization for optimal catheter placement, quantitative tumor perfusion measurements have yet to be demonstrated.

In recent studies, hepatic perfusion measurements were performed using dynamic contrast-enhanced magnetic resonance imaging (DCE-MRI) with intravenous (IV) injection of gadolinium-based contrast agents. These perfusion measurements demonstrated good correlation to radio-labeled microsphere measurements in a rabbit model (r=0.93) and to thermal diffusion probe measurements in a pig model after portal vein occlusion (r=0.90). Additional studies recently used DCE-MRI to evaluate alteration to HCC perfusion after a TACE procedure and fibroid perfusion after a uterine fibroid embolization procedure. However, in these studies, pre- and post-therapy DCE-MRI was performed separately from the interventional procedures.

To use DCE-MRI for intra-procedural monitoring of TAE and TACE procedures, perfusion measurements must be performed iteratively at each stage of embolization. Recent developments of the magnetic resonance interventional radiology (MR-IR) system (a digital subtraction angiography (DSA) suite adjacent to a dedicated MRI scanner) should facilitate acquisition of functional imaging data for infra-procedural guidance. However, with IV contrast injection, the number of DCE-MRI measurements is limited by cumulative dose and the requisite wash-out times between injections. Transcatheter intra-arterial (IA) injections permit reductions in contrast dose while increasing liver tumor conspicuity and reducing wash-out times. For DCE studies, targeted delivery of the contrast agent to the hepatic artery should simplify the evaluation of enhancement curves by requiring consideration of only a single arterial input supply (as opposed to complex dual-supply liver perfusion models). TRanscatheter Intra-arterial Perfusion (TRIP)-MRI may be ideal for the iterative detection of perfusion reductions resulting from super-selective injection of embolic materials during TAE and TACE procedures.

SUMMARY OF THE INVENTION

The present invention provides a method for detecting reductions in tumor perfusion during transcatheter arterial embolization. In particular, the present method provides transcatheter intra-arterial perfusion (TRIP)-MRI for detecting serial reductions in tumor perfusion during transcatheter arterial embolization (TAE).

In one embodiment, a catheter is positioned in a hepatic artery under x-ray angiography. The subject is transferred to a magnetic resonance imaging device and a baseline transcatheter intra-arterial perfusion MRI is performed. A series of transcatheter arterial embolization (TAE) injections are performed in stages with a short time interval between each stage. A transcatheter intra-arterial perfusion (TRIP) MRI is performed after each embolic stage. The functional endpoint of the TAE embolic treatments are determined using TRIP MRI measurements. For each TRIP-MRI measurement, contrast agent is injected through the intra-arterial catheter. A time series of images is acquired to visualize contrast agent uptake within the tissue. A time series curve showing contrast agent uptake within each image voxel is evaluated to provide either semi-quantitative or fully quantitative perfusion measurements. Either the area under this curve (AUC) or maximum upslope (MUS) of the curve is calculated to provide a semi-quantitative perfusion measurement. Alternatively, the curve can be fit to a standard pharmacokinetic model to produce fully quantitative perfusion measurements or alternative measurements reflective if microvessel permeability (Ktrans and/or kep). The serial TAE and TRIP-MRI procedures are repeated until stasis.

DETAILED DESCRIPTION OF THE PREFERRED EMBODIMENTS

The invention provides a method for monitoring embolization procedures and in particular to determining embolic endpoints for treatment of tumors. An arterial catheter is used to inject embolizing particles into the blood vessels feeding the tumor in a series of injections, and transcatheter intra-arterial perfusion magnetic resonance imaging (TRIP-MRI) is performed following each injection of embolic particles until measurements indicate that stasis is reached (or alternatively that some selected sub-stasis endpoint is achieved).

Perfusion refers to blood flow to tissues or an organ by way of the blood vessels. Perfusion MRI evaluates microscopic blood flow in the capillaries and venules using magnetic resonance image data (typically via IV injection of a contrast agent tracer). Transcatheter intra-arterial perfusion (TRIP) refers to the injection of the contrast agent being made through the lumen of a catheter inserted into the patient's artery.

The following tests were performed. In the testing, four rabbits were implanted with VX2 liver tumors (N=8 tumors). The Northwestern University Animal Care and Use Committee approved all experiments described herein. Five New Zealand white rabbits weighing 4-5 kg were used in the experiments. The rabbit VX2 tumor model was used because the VX2 tumor blood supply is almost entirely from the hepatic artery, similar to that of human HCC and rabbit hepatic arteries are sufficiently large to permit hepatic artery catheterization. VX2 tumor cells were initially grown in the hind limb of a donor rabbit. These cells were harvested and implanted in the left liver-lobe of four additional rabbits, inducing liver tumors in 14-28 days. The eight VX2 liver tumors were grown to diameters ranging from 0.5 to 3.0 cm.

In beginning the present method, catheters were positioned in the hepatic arteries of the rabbits under x-ray angiography. An x-ray digital subtraction angiography (DSA) was performed using a Siemens C-arm PowerMobil unit (from Siemens Medical Solutions, Erlangen Germany). Each rabbit was initially sedated using a mixture of IM ketamine (80 mg/kg) and xylazine (5 mg/kg). After intubation, inhalational isoflurane (2-3.5%) was administered for anesthesia through an endotracheal tube with a small animal ventilator. Vascular access was achieved in the femoral artery through surgical cut-down. A 2-F catheter (JB-1, Cook, Bloomington, Ind.) was advanced over a 0.014-inch diameter guidewire into the hepatic arteries. X-ray DSA imaging of the hepatic arteries was performed using 2 mL manual injections of Omnipaque 350 (Amersham, Princeton, N.J.). The catheter was advanced into the left hepatic artery of each rabbit for acquisition of pre-TAE DSA images.

After insertion of the catheter, each animal was then transferred to an adjacent MR (magnetic resonance) scanner. All subsequent TAE and iterative TRIP-MRI scans were performed with the rabbits positioned inside the MR scanner. MRI was performed using a 1.5 T Magnetom Sonata clinical MRI scanner (Siemens Medical Solutions, Erlangen, Germany). The rabbits were imaged in the supine position using a clinical head coil.

After transferring the rabbits to the magnetic resonance imaging facility, a first transcatheter intra-arterial perfusion magnetic resonance imaging (TRIP MRI) step was performed to obtain baseline values. The baseline values were obtained prior to the embolization steps. To avoid registration complications, rabbits remained within the scanner bore throughout TRIP-MRI and TAE (transcatheter arterial embolization) procedures.

The TRIP-MRI scans were performed with hand injections of 3.0 mL of a 5% gadopentetate dimeglumine solution (Magnevist, Berlex) as a contrast agent over 6 seconds. The MRI scan was performed using a 2D multi-slice saturation-recovery (SR) spoiled-gradient-echo (spoiled-GRE, or S-GRE) pulse sequence with the following parameters: TR/TE/TI=2.7/1.36/104 ms, flip angle=15°, five contiguous axial slices of 5 mm thickness, 200×100 mm² FOV, 128×64 matrix, 500 Hz/pixel bandwidth, 100 second total scan time with the five slice volume continuously sampled at one second intervals following the contrast injection. Based upon coverage and temporal sampling requirements, TI was minimized and the flip-angle was optimized to provide a relatively linear relationship between signal intensity and tissue $R_1$ over the expected range of $R_1$ values (0.67 s$^{-1}$<$R_1$<10 s$^{-1}$, 100 ms<$T_1$<1500 ms) while simultaneously providing relatively high sensitivity to $R_1$ increases after administration of the contrast agent (see FIG. 1). Each contrast injection was immediately followed by a 10 mL saline flush injected over 7-10 seconds.

Figure 1:
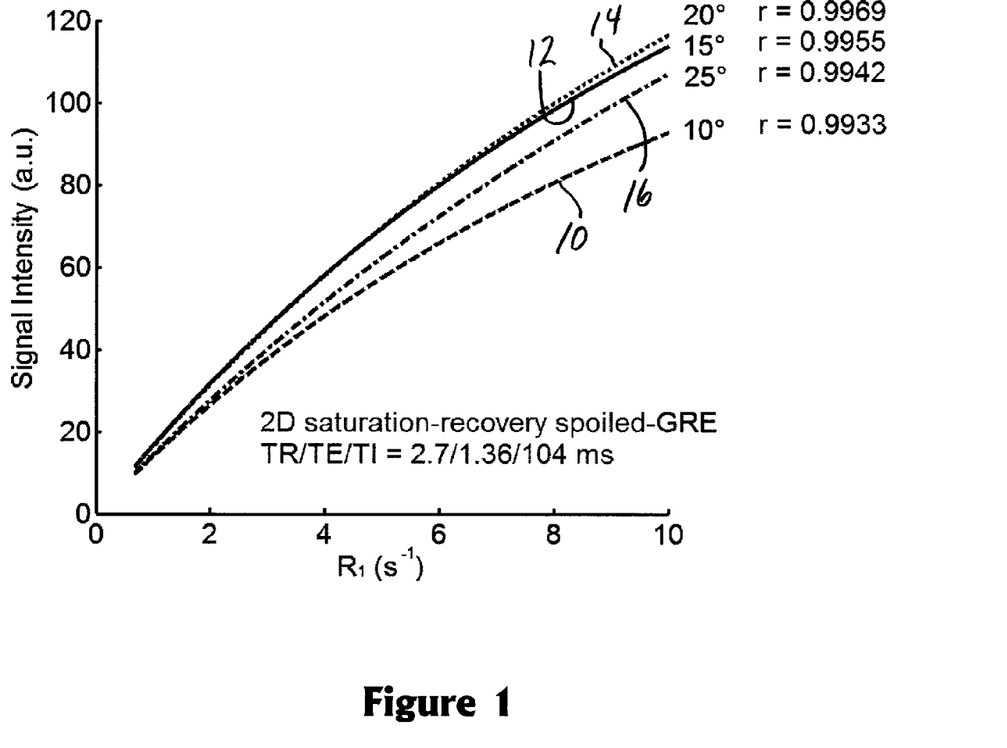
FIG. 1 is a graph showing the relationship between signal intensity of a saturation recovery GRE sequence and relative signal intensity over a range of T1 values for different sequence flip-angles.

FIG. 1 is a graph that shows simulation results that demonstrate a strong linear relationship between the signal intensity of a 2D saturation-recovery spoiled-GRE (gradient-echo) sequence (TR/TE/TI=2.7/1.36/104 ms) and sample $R_1$ over the expected range of $R_1$ values (0.67 s$^{-1}$<$R_1$<10 s$^{-1}$, 100 ms<$T_1$<1500 ms). Flip angles of 10°, 15°, 20° and 25° are shown by curves 10, 12, 14, and 16, respectively. Limiting sequence flip-angle to 15° as shown at 12, as opposed to 20° as shown at 14, reduces unwanted sensitivity to inflow effects while continuing to provide relatively high sensitivity and linear correlation to $R_1$ changes.

Once the baseline values were obtained, serial transcatheter arterial embolization (TAE) stages were performed with about 0.5 million Embosphere® microspheres being injected at each embolic stage. The embolic stages were carried out with about 10 minutes between each stage. In particular, the embolization was performed using 40-120 µm Embosphere® particles (BioSphere Medical™, Rockland Mass.) which are hydrophilic beads made of an acrylic co-polymer cross-linked with gelatin. Embosphere® microspheres are supplied in pre-filled syringes containing 2 mL of microspheres (16 million spheres) mixed in 6 mL of saline solution (total solution 8 mL/pre-filled syringe). Each syringe was diluted with a saline and iodinated contrast agent (Omnipaque 350, Amersham, Princeton, N.J.) mixture to yield about 250,000 microspheres/mL.

Iterative TAE procedures with intra-procedural TRIP-MRI scanning was performed with the rabbit subjects remaining inside the scanner bore. For each TAE iteration, Embospheres® were super-selectively delivered by hand injection through the same catheter previously placed during DSA (the same catheter used for intra-arterial (IA) contrast injections). For each iterative stage of embolization, about 500,000 microspheres (2 mL of the prepared Embosphere® solution) were injected. The time interval between iterative stages of TAE was roughly 8-10 minutes.

Transcatheter intra-arterial perfusion magnetic resonance imaging (TRIP MRI) was performed at baseline (as noted above) and after each subsequent embolic stage. The serial TAE and TRIP-MRI steps were repeated until stasis. The TRIP-MRI scans were performed to assess serial reductions in tumor perfusion during each TAE stage. The TAE stages were continued until suspected stasis (after three to four Embosphere® microsphere injections) as qualitatively assessed by a lack of tumor enhancement after contrast injection.

The first-pass time course of signal enhancement was measured in both tumors and hepatic arteries. Measurements of the tumors included tumor area-under-curve (AUC) determination and maximum up-slope (MUS) determination, each normalized by arterial input, were used to assess iterative perfusion reduction. Perfusion measurements across the TAE stages were compared with paired t-tests and linear regression.

Over the course of the tests, TRIP-MRI semi-quantitative perfusion measurements were performed in the eight rabbit liver tumors during staged TAE. The area-under-curve (AUC) value decreased from a pre-TAE baseline value of 0.408±0.147 to 0.065±0.036 (mean±SD (standard deviation), p<0.0001) after completion of the TAE stages. The maximum up-slope MUS value decreased from a pre-TAE baseline of 0.151±0.057 to 0.027±0.009 (mean±SD, p<0.0001) after completion of TAE reductions. The area-under-curve (AUC) value and maximum up-slope (MUS) value after each embolic stage were statistically significant (p<0.006 for each group of paired comparisons). The area-under-curve (AUC) value strongly correlated with the maximum up-slope (MUS) value (r=0.966, p<0.0001). The testing shows that TRIP-MRI can detect serial reductions in liver tumor perfusion during TAE. Thus, TRIP-MRI measures are used to target functional embolic endpoints during TAE.

After the final TAE iteration, rabbits were returned to the adjacent x-ray DSA unit for follow-up angiography and confirmation of complete stasis of ante grade blood flow to the liver tumors. Each animal was then euthanized for tumor confirmation at gross necropsy.

The magnetic resonance data analysis concentrated on separate regions-of-interest (ROI), which were drawn to measure the time course of signal intensity (SI) within both hepatic arteries and tumor tissues. Regions of interest (ROIs) in hepatic arteries were selected to monitor the arterial input function (AIF). Tumor ROIs were placed in peripheral hypervascular regions to avoid measurements of the necrotic core that is typically present in VX2 tumors. Depending upon tumor size and the requisite number slices to fully cover each tumor, the number of ROIs for each tumor ranged from 1 to 4. Identical tumor ROIs were used for each set of first-pass measurements.

Signal intensity (SI) time curves were generated separately for each region of interest (ROI). The signal intensity time curve is termed $SI_{contrast}[t]$. The baseline pre-procedural signal intensity value ($SI_{baseline}$) was measured prior to the first contrast administration of the study. The baseline $SI_{baseline}$ measurements were used to normalize subsequent SI time curves. The time course of differential SI changes ($\Delta SI[t]$) from immediate pre-contrast injection baseline ($SI_{pre-contrast}$) was calculated for each ROI according to the formula: $\Delta SI[t] = (SI_{contrast}[t] - SI_{pre-contrast})/SI_{baseline}$.

The first-pass starting point of the arterial input function (AIF) was selected as that time position immediately prior to the initial rapid signal rise. For conventional full dose IV techniques, the second-passage of the contrast bolus is typically used to establish the first-pass endpoint. However, for the low dose TRIP-MRI techniques of this study, the second-pass was not observed. Based upon conservative estimates from previous VX2 rabbit studies using IA (intra-arterial) injections with larger contrast doses, the end-point of the first-pass was estimated to occur 30 second after the first-pass starting point (roughly twice the total contrast and saline flush injection time).

Two semi-quantitative perfusion parameters, the area-under-the-curve (AUC) and maximum up-slope (MUS), were calculated using the $\Delta SI[t]$ time curve for each ROI (region of interest) after each TRIP-MRI measurement. These parameters were measured within the time window between the first-pass start and end points. To correct for potential variations in arterial input, each tumor perfusion parameter was normalized by the corresponding AIF parameter: $AUC_{norm} = AUC_{tumor}/AUC_{AIF}$ and $MUS_{norm} = MUS_{tumor}/MUS_{AIF}$.

A statistical analysis was performed wherein the normalized area-under curve ($AUC_{norm}$) and maximum up-sloop ($MUS_{norm}$) parameters that were derived from adjacent infra-procedural embolic stages were separately compared using paired t-tests with a=0.05. Corresponding normalized $AUC_{norm}$ and $MUS_{norm}$ measurements (derived from identical $\Delta SI[t]$ time curves) were compared using linear regression.

Figure 2:
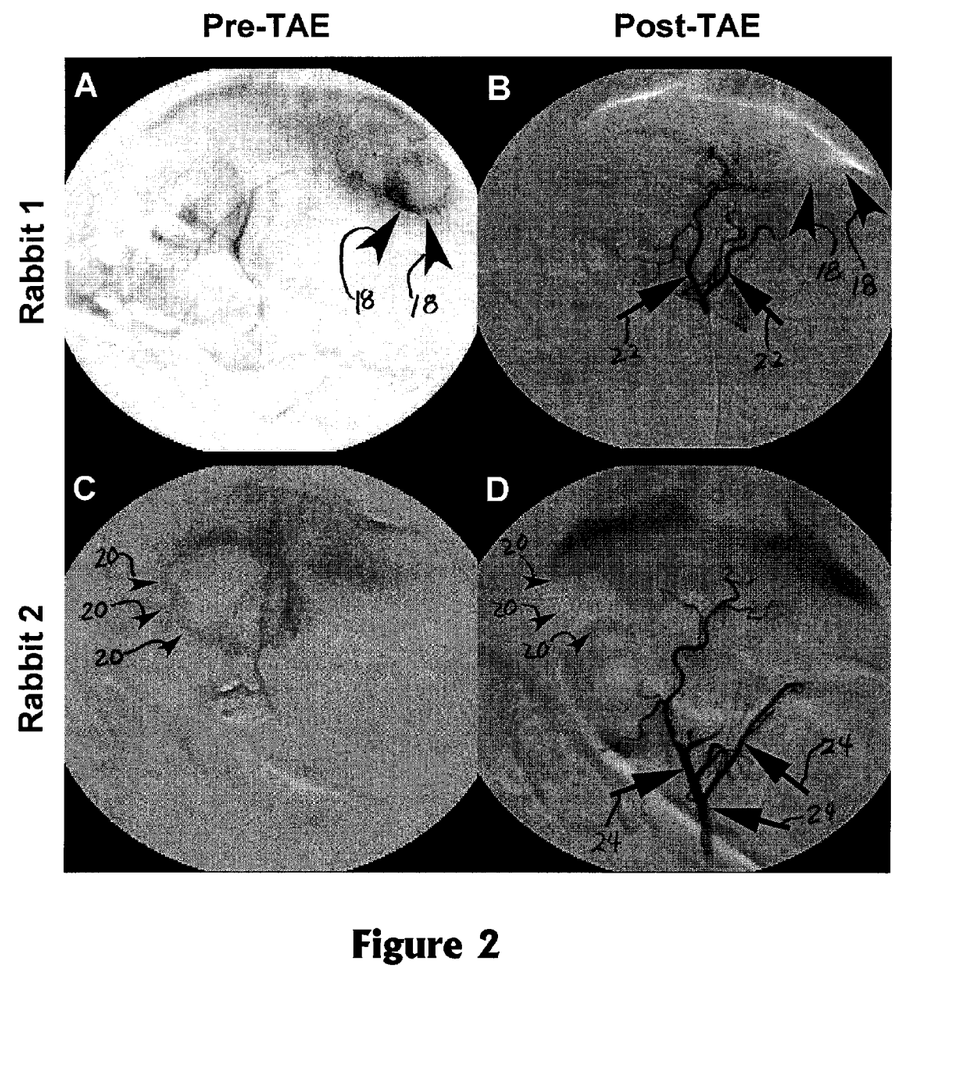
FIG. 2 is an arrangement of four x-ray images of pre-TAE and post-TAE tumors in each of two rabbit test subjects.

The digital subtraction angiography (DSA) imaging was used in the four rabbits in which eight VX2 liver tumors were grown. Each rabbit was successfully catheterized under DSA. Representative pre- and post-TAE DSA images following iodinated contrast injection into the left hepatic artery are shown in FIG. 2. The DSA images confirm post-TAE DSA successful stasis of ante grade blood flow in each rabbit.

In particular, FIG. 2 shows a super-selective hepatic artery DSA in two representative rabbits, labeled Rabbit 1 and Rabbit 2. Baseline pre-TAE (transcatheter arterial embolization) images (images A and C) show peripheral enhancement of VX2 liver tumors (as indicated by arrowheads 18 and 20, respectively). Corresponding post-TAE DSA (images B and D) show complete lack of tumor enhancement (at the arrowheads 18 and 20) and increased definition of proximal vessels (as shown by arrows 22 and 24, respectively) due to reduced flow to the tumor and subsequent reflux of contrast into adjacent vessels, The magnetic resonance imaging was performed to obtain baseline pre-TAE images of the VX2 tumors, which were acquired at peak enhancement. These images demonstrated characteristic peripheral rim signal enhancement similar to that of the pre-TAE DSA images. Tumor enhancement was minimal in the corresponding post-TAE images. A total of 16 regions of interest (ROIs) were drawn for the eight VX2 tumors (four ROI for each rabbit).

Figure 3:
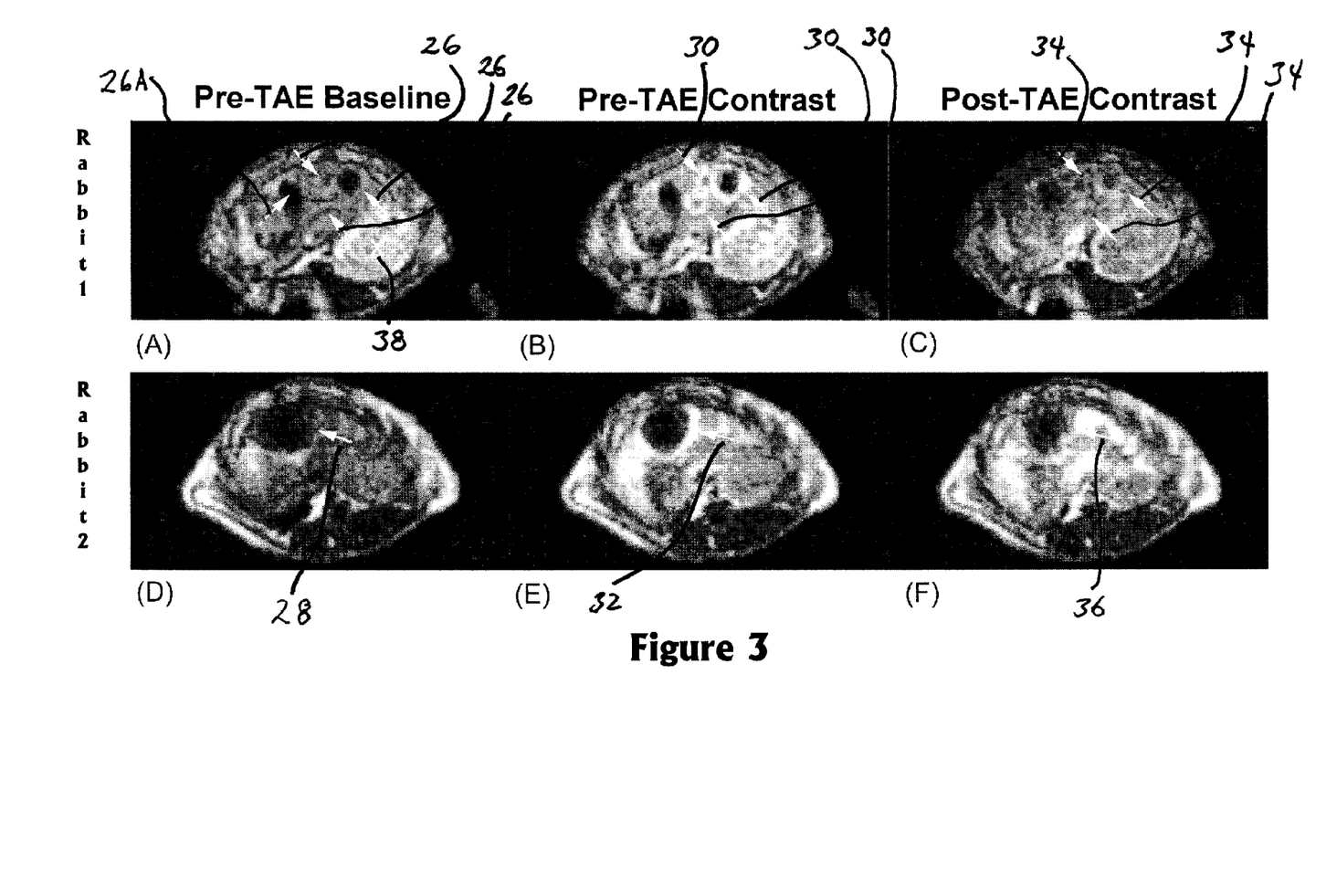
FIG. 3 is an arrangement of six magnetic resonance images showing pre-TAE images, and post-TAE images with and without contrast, of tumors in each of two rabbit test subjects.

In FIG. 3 is an illustration of representative saturation-recovery spoiled-GRE MR images in two VX2 liver tumor rabbits (Rabbit 1 images are shown in the top row and images of Rabbit 2 are shown in the bottom row) before and after transcatheter arterial embolization (TAE). Pre-embolization images acquired before contrast injection (images A and D for Rabbits 1 and 2, respectively) provide a pre-procedural signal baseline (as indicated by arrows 26 and 28). Pre-embolization images acquired after IA (intra-arterial) injection at peak enhancement (images B and E for Rabbits 1 and 2, respectively) demonstrate characteristic peripheral rim signal enhancement for each VX2 tumor (as indicated by arrows 30 and 32). Post-embolization images acquired after IA contrast injection (images C and F for Rabbits 1 and 2, respectively) demonstrated only limited enhancement of the tumors in the corresponding regions (indicated by the arrows 34 and 36, respectively). Three tumors of 0.5, 1.0 and 1.5 cm diameter were embolized in the first rabbit (which are shown in the top row). A single 3.0 cm tumor was embolized in the second rabbit (as shown in the bottom row). Peak enhancement images (images B and E) also depict the characteristic non-enhancing necrotic core of the VX2 tumors. Additional structures depicted in the top row include the gall bladder (indicated by the dashed-arrow 26A) and the stomach (indicated at x at 38).

Figure 4:
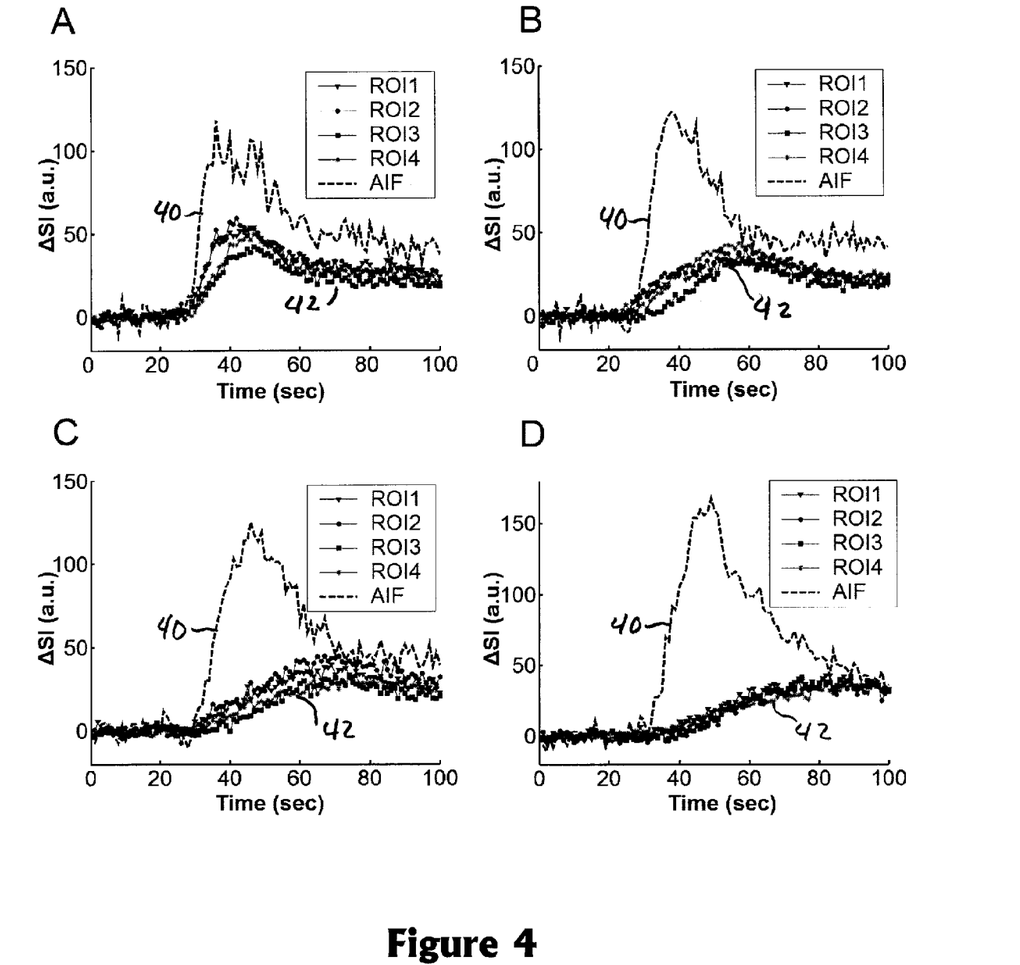
FIG. 4 is an arrangement of graphs showing contrast signal enhancement time curves (4 curves for 4 different region-of-interest, ROI, within the same tumor) from image series collected from rabbit test subject during four progressive stages of TAE (A-D)

Change in signal intensity ΔSI[t] curves for a single representative rabbit are shown in FIG. 4 in four tumor containing regions of interest ROI1-ROI4 over progressive embolization stages A through D. In particular, the curves are iterative signal intensity change ΔSI[t] curves for a single VX2 liver tumor rabbit. Graph A is a measurement made before embolization injections as a baseline and graphs B-D illustrate separate measurements after each serial Embosphere® injection during progressive TAE stages. An arterial input function (AIF) ΔSI[t] curve 40 is also shown in the graphs. This AIF curve 40 remained relatively unchanged over the course of the embolization stages A-D. However, the change in signal intensity curves ΔSI[t], indicated generally at 42, for each tumor region of interest ROI1-ROI4 was altered after each embolization stage.

The total number of embolic stages evaluated for each rabbit was dependent the number of sequential Embosphere® injections necessary to achieve stasis (later confirmed at follow-up DSA). Four embolic stages were evaluated in two rabbits while only three stages were evaluated in the remaining two rabbits. For one rabbit, technical complications with the initial post-embolization contrast injection precluded ΔSI[t] measurement and therefore only two embolic stages were evaluated.

Figure 5:
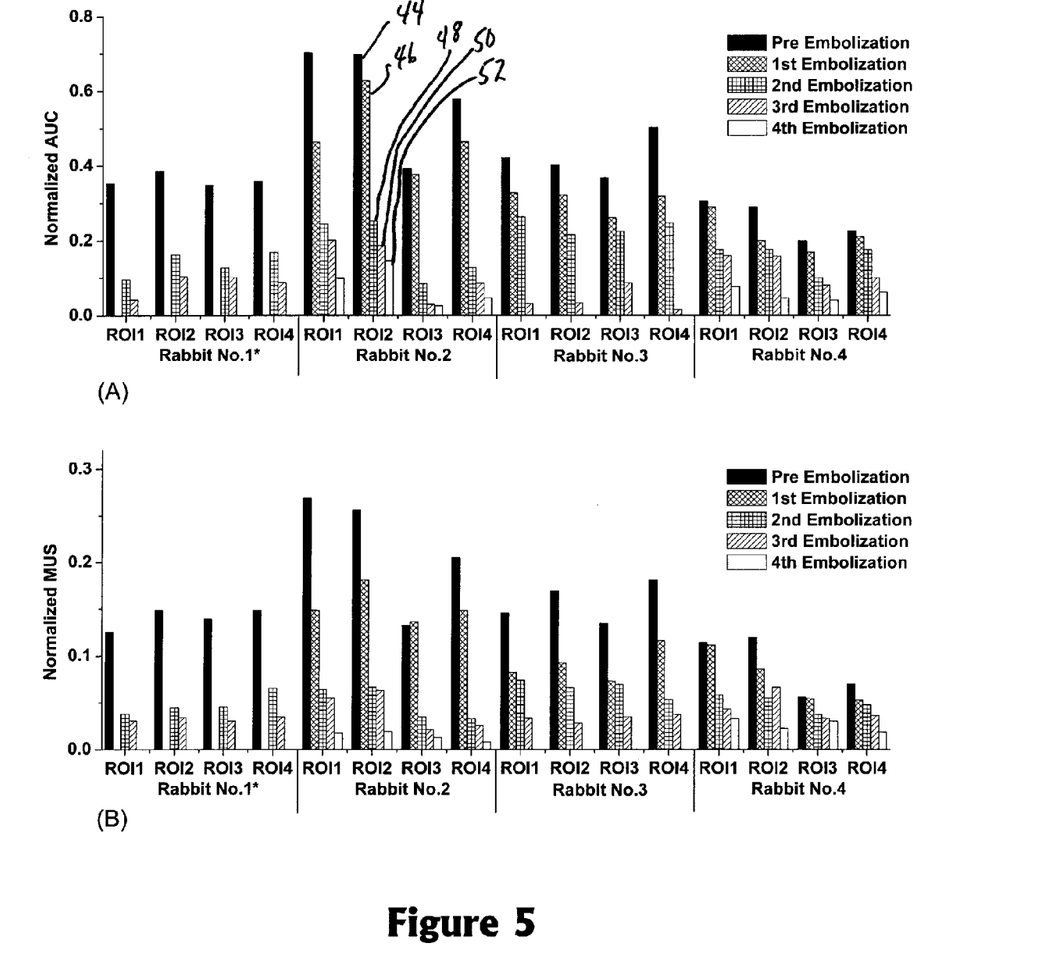
FIG. 5 is an arrangement of two graphs showing area-under-curve values and maximum up-slope values over the course of four embolic stages for each of four rabbit test subjects.

In FIG. 5, semi-quantitative perfusion parameters, a normalized area-under-curve parameter $AUC_{norm}$ and a normalized maximum up-slope parameter $MUS_{norm}$, are shown. The parameter values AUC and MUS are derived from the change in signal intensity ΔSI[t] curves. Derivation of AUC and MUS values is known to the person of skill in this art and so is not described in further detail here. The parameter values are shown by bar graph A showing the area-under-curve (AUC) values and bar graph B showing the maximum up-slope (MUS) values. The graphs A and B are divided into sections for each of the four rabbit subjects, Rabbits 1-4, and show parameter values for four regions of interest ROI1-ROI4 for each rabbit. The bars on the graphs A and B, show the values for a pre embolization baseline stage and after each of four embolization stages. For example, for Rabbit no. 2, at region of interest 2 (ROI2), in the normalized area-under-curve (AUC) graph A, the pre embolization AUC value 44 is shown to the left, the AUC parameter value following the first embolization stage is shown at 46, the AUC parameter value following the second embolization stage is shown at 48, the AUC parameter value following the third embolization stage is shown at 50, and the parameter value following the fourth embolization stage is shown at 52. The same arrangement is shown for other regions of interest and for other rabbit subjects, both for the AUC values and MUS values.

The FIG. 5 graphs depict the reduction of the semi-quantitative tumor perfusion parameters after each Embosphere® microsphere injection in each individual rabbit and each region of interest ROI, with only two exceptions: the normalized maximum up-slope ($MUS_{norm}$) value for the third region of interest ROI3 in Rabbit No. 2 after the first embolization stage and the normalized maximum up-slope ($MUS_{norm}$) value for the second region of interest ROI2 in Rabbit No. 4 after the third embolization stage. All other parameter values, the normalized area-under-curve AUC values of Graph A and the normalized maximum up-slope MUS values of Graph B show progressive reduction with each TAE stage. (For rabbit No. 1, technical complications with contrast injection after the first TAE stage precluded a ΔSI[t] measurement).

Figure 6:
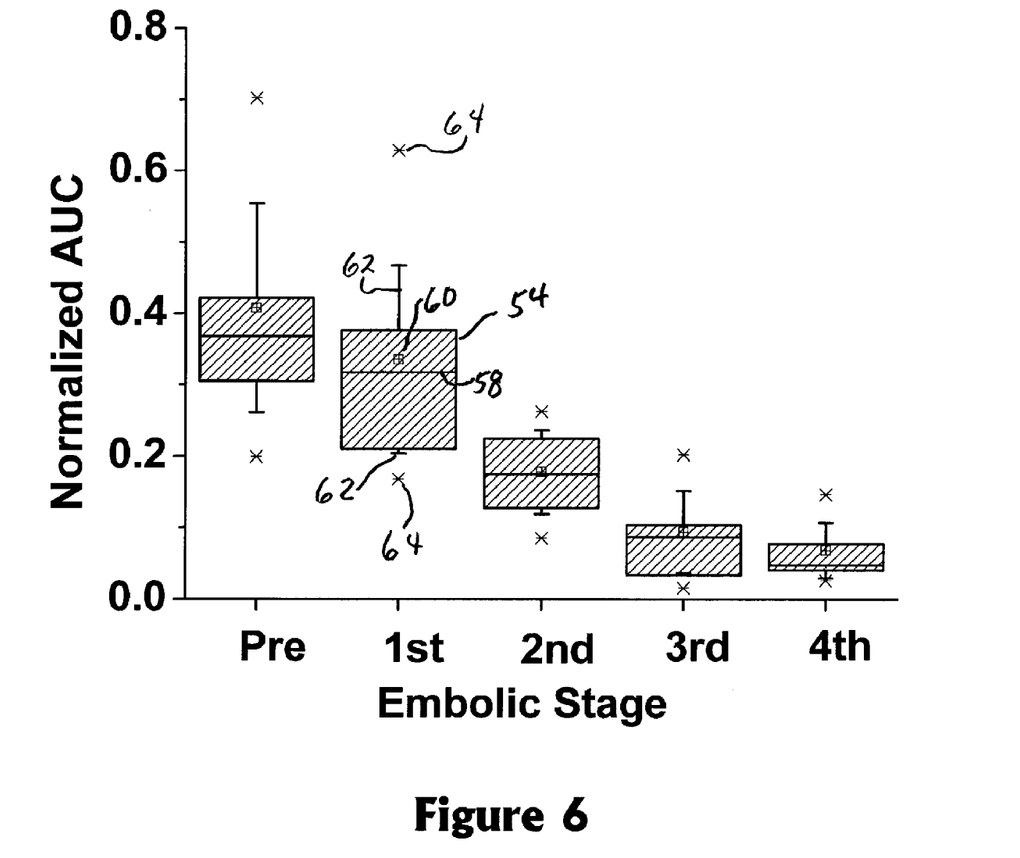
FIG. 6 is a graph showing normalized area-under-curve values over the course of four embolic stages.
Figure 7:
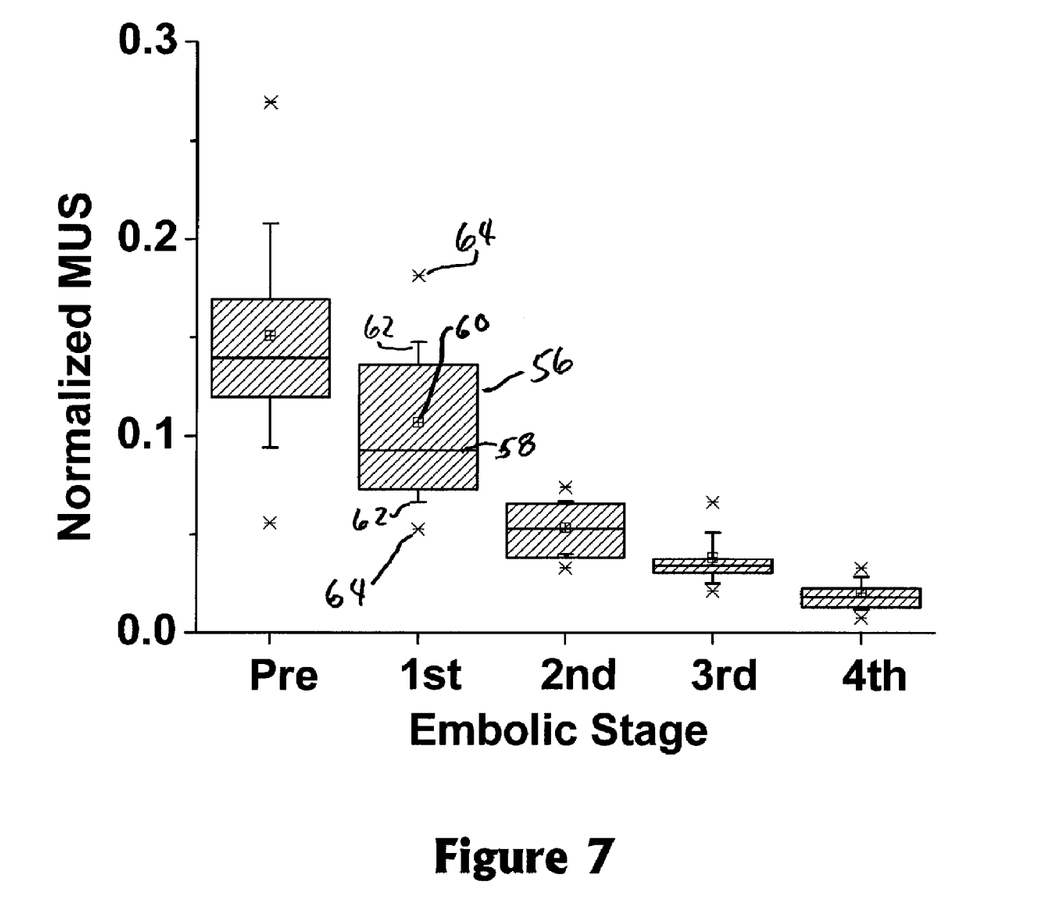
FIG. 7 is a graph showing normalized maximum up-slope values over the course of four embolic stages.

In FIGS. 6 and 7, the Graphs A and B of FIG. 5 are reduced. FIG. 6 illustrates box and whisker plots 54 which show that the reduction of the normalized AUC perfusion parameters after each embolic stage are statistically significant. FIG. 7 illustrates box and whisker plots 56 that show the reduction of the normalized MUS perfusion parameters. The normalized AUC boxes 54 of FIG. 6 and the normalized MUS boxes 56 of FIG. 7 represent the lower and upper quartiles. A line 58 is shown inside each box that identifies the 50th percentile (median); small crossed squares 60 show the mean value; whiskers 62 indicate the standard deviation; stars or asterisks 64 are the extreme points.

The normalized area-under-curve value $AUC_{norm}$ decreased from a pre-TAE baseline of 0.408±0.147 to 0.065±0.036 (mean±SD, p<0.0001) after completion of the final TAE stage. The maximum up-slope $MUS_{norm}$ decreased from a pre-TAE baseline of 0.151±0.057 to 0.027±0.009 (mean±SD, p<0.0001) after completion of the final TAE stage. The reduction of both the $AUC_{norm}$ and the $MUS_{norm}$ perfusion parameters after each embolic stage were statistically significant (p<0.006 for each group of paired comparisons).

Figure 8:
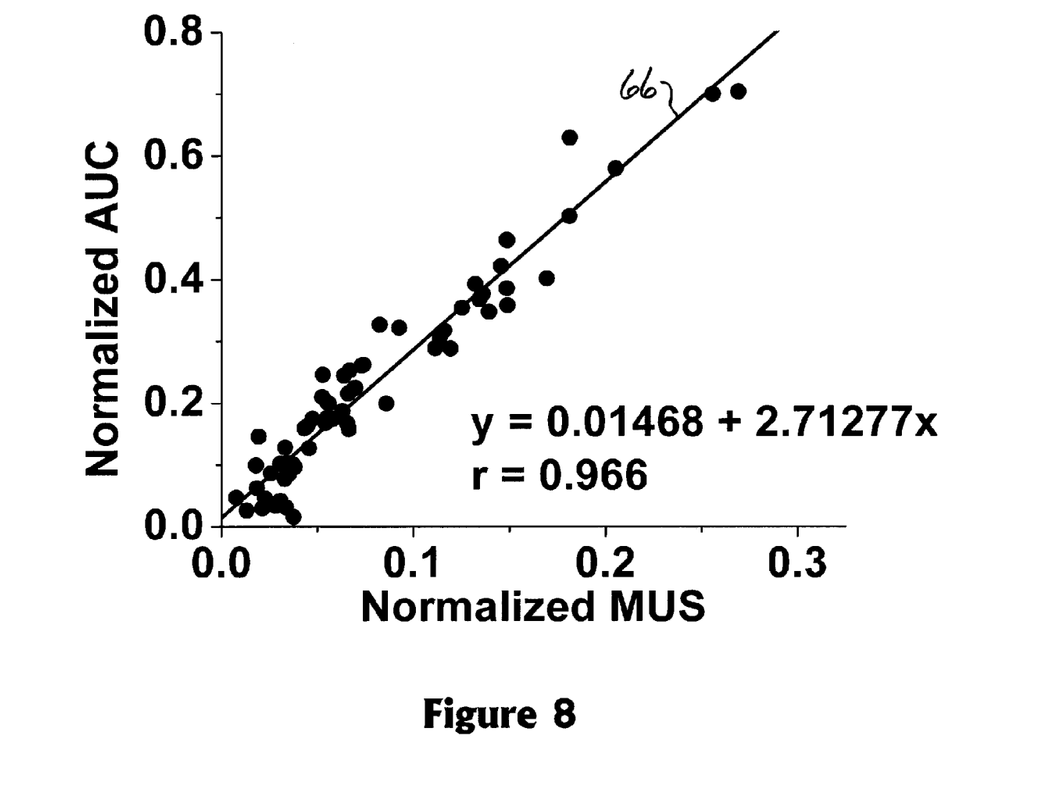
FIG. 8 is a graph plotting the normalized area-under-curve values over normalized maximum up-slope values.

FIG. 8 is a regression plot that demonstrates a strong linear relationship 66 between the normalized AUC and MUS values. The nominal area-under-curve $AUC_{norm}$ measurements demonstrated a strong correlation to the corresponding normalized maximum up-slope $MUS_{norm}$ measurements (r=0.966, p<0.0001) as is apparent from the linear regression 66.

The study successfully demonstrated the use of iterative TRIP-MRI for detecting serial reduction of liver tumor perfusion during TAE. Even with a 90% reduction in contrast dose compared to full dose IV strategies, the TRIP-MRI approach produced tumor enhancement curves that were visibly altered during each stage of TAE. These alterations were reflected in the semi-quantitative perfusion parameters derived from these enhancement curves. Two semi-quantitative perfusion parameters, area-under-curve (AUC) and maximum up-slope (MUS), each demonstrated significant reductions after each embolic stage in the VX2 rabbit liver tumor model.

The TRIP-MRI studies have shown that of the two semi-quantitative parameters (MUS and AUC) to monitor TAE-induced alteration to the tumor enhancement curves, the maximum up-slope (MUS) parameter, also described as the wash-in rate, is closely associated to both tissue per fusion and permeability with perfusion predominating. Therefore, according to the present invention, maximum up-slope (MUS) is used for iterative evaluation of enhancement curves during transcatheter arterial embolization (TAE), which reduces perfusion but has minimal immediate impact upon vascular permeability. The area-under-curve (AUC) parameter, however, can be simultaneously dependent upon perfusion, permeability, and leakage space and is used according to the present invention, either alternatively or in addition to the MUS parameter. Experimental data has indicated that tumor area-under-curve (AUC) values are highly correlated to the volume transfer constant, $K^{trans}$, during the first pass of an extracellular gadolinium contrast agent. For flow limited extracranial tumors, the transfer constant $K^{trans}$ was primarily dependent upon tumor blood flow. With the aforementioned assumptions, area-under-curve (AUC) parameter is thus a semi-quantitative parameter for iterative evaluation of reduction to liver tumor perfusion. Therefore, the AUC changes were detected with the reductions in tumor perfusion during each stage of TAE. The studies described herein have established a strong linear relationship was demonstrated between MUS and AUC values (r=0.966), firmly supporting these assumptions.

Of these semi-quantitative perfusion parameters, both are effective for TRIP-MRI monitoring during TAE. Both MUS and AUC parameters are relatively simple to derive from the signal enhancement curves because neither requires complex pharmokinetic modeling. Each was successfully reflective of perfusion changes during progressive stages of TAE. However, as the AUC calculation involves integration of a large number of data points along the enhancement curve, the AUC parameter is likely more robust than MUS measurements based upon differential comparison of only a few neighboring data points. AUC measurements should be less sensitive to the adverse effects of respiratory motion, which generate artifacts in the enhancement time curves. The increased sensitivity of MUS measurements to motion artifacts may explain the two previously described exceptions to progressive reduction in MUS values between TAE stages, not demonstrated in the corresponding AUC measurements. However, these assumptions regarding increased motion sensitivity of MUS parameters require further validation.

The examples presented herein describe the use of an area-under-curve parameter for each acquiring further images step and/or a maximum up-slope parameter for each acquiring further images step to determine changes in perfusion and/or embolic endpoint. The present invention also envisions the use of further parameters relating to the perfusion measurements, including for example a time-to-peak parameter, a k-trans parameter, a $k_{ep}$ parameter, and an absolute tissue blood flow value. Any parameter that is indicative of changes in perfusion or indicative of embolic endpoints are within the scope of the present invention.

The present study lacked a gold standard validation of sub-stasis reductions to tumor perfusion. Ideally, microspheres would be used to provide gold-standard perfusion measurements at each embolic stage for comparison to the semi-quantitative TRIP-MRI measurements. However, studies in the rabbit model have already demonstrated a strong correlation (r=0.93) between microsphere measurements and IV DCE-MRI quantitative perfusion measurements performed using the same SR spoiled-GRE pulse sequence. Furthermore, iterative administration of microspheres for hepatic perfusion measurements would require additional invasive procedures, complicating an already relatively time constrained experiment. Finally, the arterial flow alteration due to hepatic artery catheter placement may complicate interpretation of microsphere results.

Contrast agent wash-out times and the associated impact upon repetitive TRIP-MRI perfusion measurements were not rigorously evaluated in these studies. Such evaluations were beyond the scope of this initial study to establish the feasibility of detecting progressive perfusion reductions during stages of TAE. Residual contrast agent may adversely alter iterative first-pass measurements. However, using a small dose for each TRIP-MRI scan with adequate delays between TAE stages, residual tissue and blood pool concentrations should be minimal. Furthermore, each of the studies demonstrated a negligible second passage of the contrast bolus. Lack of a second contrast passage should limit cumulative dose to targeted tissues. Provided that cumulative tissue concentration remains within a limited range, successive TRIP-MRI perfusion measurements should remain accurate, particularly if accounting for alterations to baseline signal intensity. Early translational studies will require rigorous contrast dose optimization with respect to targeted lobar and tumor volumes, frequency of iterative TRIP-MRI perfusion measurements, and contrast injection rate.

Thus, the present TRIP-MRI technique is used to determine functional endpoints of TAE and TACE. The present method is particularly applicable in clinical settings using hybrid MR-IR suites. In a clinical setting, patients undergo hepatic artery catheter placement under x-ray guidance, then are transferred between the MR and IR units during iterative stages of embolization. The interventional radiologist targets functional endpoints of tumor perfusion reduction using the parameters determined from the TRIP MRI stages, an improvement over using conventional x-ray DSA. The present invention provides that iterative TREP-MRI is used to detect serial reductions in liver tumor perfusion during TAE. Serial liver tumor perfusion measurements permit standardization of embolization end-points to optimize therapy while minimizing toxicity to normal liver tissues.

The perfusion image acquisition is preferably perfusion magnetic resonance image acquisition. Perfusion x-ray computed tomography image acquisition, perfusion radionuclide image acquisition, and a transcatheter intra-arterial perfusion magnetic resonance image acquisition may also be used in the present method.

Although described for use in treatment of liver cancer, the present method may be used for determining embolic endpoints for a variety of different cancers and other ailments and conditions. For example, in addition to the hepatocellular carcinoma described above, the present method may be applied to colon cancer, pancreas cancer, breast cancer, kidney cancer, lymphoma, uterine fibroid, bone cancer, sarcoma, cholangiocarcinoma, a brain tumor, meningioma, gynecologic cancer, prostate cancer, and neuroendocrine cancer. The present method refers to embolic endpoints. As noted above, these need not be a complete cessation of blood flow to the tumor or other region of interest, but are often a reduction in flow to a desired level. The present method may also be utilized to achieve other objectives rather than obtaining an embolic endpoint, and all such other objectives are within the scope of this invention.

Thus, the present invention provides a method for detecting endpoints in embolization procedures by iterative TRIP-MRI to detect serial reduction in tumor perfusion during TAE.

Although other modifications and changes may be suggested by those skilled in the art, it is the intention of the inventors to embody within the patent warranted hereon all changes and modifications as reasonably and properly come within the scope of their contribution to the art.

We claim:

1. A method for serially determining changes in perfusion to tissues, comprising the steps of:
   injecting contrast material into a catheter that is positioned in a blood vessel supplying a targeted tissue of interest;
   acquiring a time series of images that depicts an uptake of the contrast material within the targeted tissue;
   deriving semi-quantitative or quantitative perfusion metrics based upon the time series of images;
   altering perfusion to the targeted tissue by injecting pharmacologic agents or embolic agents into the blood vessel supplying the targeted tissue;
   acquiring a further time series of perfusion images to serially monitor changes in tissue perfusion after each altering perfusion step;
   repeating said altering perfusion step and said acquiring further images step; and
   calculating changes in perfusion metrics after said acquiring of the further series of perfusion images.

2. A method as claimed in claim 1, wherein said steps of altering perfusion to the targeted tissue and monitoring changes with perfusion imaging are halted upon detection of a predetermined reduction in perfusion.

3. A method as claimed in claim 1, wherein said perfusion image acquisition is a perfusion magnetic resonance image acquisition.

4. A method as claimed in claim 1, wherein said steps of acquiring the perfusion images is a perfusion x-ray computed tomography image acquisition.

5. A method as claimed in claim 1, wherein said steps of acquiring the perfusion images is a perfusion radionuclide image acquisition.

6. A method as claimed in claim 3, wherein said steps of acquiring the perfusion images is a transcatheter intra-arterial perfusion magnetic resonance image acquisition.

7. A method as claimed in claim 1, further comprising the step of:
   determining an area-under-curve parameter for each said acquiring further images step.

8. A method as claimed in claim 1, further comprising the step of:
   determining a maximum up-slope parameter for each said acquiring further images step.

9. A method as claimed in claim 1, further comprising the step of:
   determining a time-to-peak parameter for each said acquiring further images step.

10. A method as claimed in claim 1, further comprising the step of:
    determining a k-trans parameter for each said acquiring further images step.

11. A method as claimed in claim 1, further comprising the step of:
    determining a $k_{ep}$ parameter for each said acquiring further images step.

12. A method as claimed in claim 1, further comprising the step of:
    determining an absolute tissue blood flow (mL/mg/min) for each said acquiring further images step.

13. A method as claimed in claim 1, wherein the targeted tissue is a tumor.

14. A method as claimed in claim 13, wherein the tumor is a hepatocellular carcinoma.

15. A method as claimed in claim 13, wherein the tumor is a tumor selected from the following: a colon cancer, a pancreas cancer, a breast cancer, a kidney cancer, a lymphoma, a uterine fibroid, a bone cancer, a sarcoma, a cholangiocarcinoma, a brain tumor, a meningioma, a gynecologic cancer, a prostate cancer, and a neuroendocrine cancer.

16. A method for determining an embolic endpoint during an embolization procedure of a tumor, comprising the steps of:
    inserting a catheter into a blood vessel supplying the tumor using x-ray or magnetic resonance imaging guidance;
    imaging a region of the tumor using transcatheter intra-arterial perfusion magnetic resonance image acquisition to establish a baseline value, the contrast material being injected via the catheter;
    injecting an embolic agent via the catheter as a first embolization stage;
    imaging the region of the tumor using transcatheter intra-arterial perfusion magnetic resonance image acquisition in a post embolization imaging stage;
    determining at least one perfusion metric from the post embolization imaging stage; and
    performing further embolizing stages and further post embolization imaging stages until a serial reduction in perfusion is determined by said perfusion metric from the respective post embolization imaging stages.

17. A method as claimed in claim 16, wherein said at least one perfusion metric is at least one of area-under-curve parameter, maximum up-slope parameter, time-to-peak parameter, k-trans parameter, and a $k_{ep}$ parameter.

18. A method for determining an endpoint of an embolizing procedure of a tumor, comprising the steps of:
    inserting a catheter into a blood vessel supplying the tumor;
    performing a first transcatheter intra-arterial perfusion magnetic resonance image acquisition of a region of interest of the tumor;
    injecting an embolic agent into the blood vessel via the catheter in a first transcatheter arterial embolization stage;
    performing a second transcatheter intra-arterial perfusion magnetic resonance image data acquisition of the region of interest;
    determining a change in signal intensity of image data for the region of interest from the first image data acquisition and the second image data acquisition;
    injecting an embolic agent into the blood vessel via the catheter in a second transcatheter arterial embolization stage;
    performing a third transcatheter intra-arterial perfusion magnetic resonance image data acquisition of the region of interest;
    determining a change in signal intensity of image data for the region of interest from the second data image acquisition and the third image data acquisition;
    calculating a perfusion metric from the changes in signal intensity; and
    repeating the steps of injecting, performing, determining and calculating until the said perfusion metric reaches a threshold value, then halting the injection of the embolizing agent.

19. A method as claimed in claim 18, wherein said perfusion metric is at least one of area-under-curve parameter, maximum up-slope parameter, time-to-peak parameter, k-trans parameter, and a $k_{ep}$ parameter.

* * * * *